United States Patent [19]

Spies

[11] Patent Number: 4,490,914

[45] Date of Patent: Jan. 1, 1985

[54] ERROR CORRECTION SYSTEM FOR POSITION MEASURING INSTRUMENTS

[75] Inventor: Alfons Spies, Seebruck, Fed. Rep. of Germany

[73] Assignee: Dr. Johannes Heidenhain GmbH, Traunreut, Fed. Rep. of Germany

[21] Appl. No.: 455,604

[22] Filed: Jan. 4, 1983

[30] Foreign Application Priority Data

Jan. 15, 1982 [DE] Fed. Rep. of Germany ....... 3201005

[51] Int. Cl.³ .............................................. G01B 11/02
[52] U.S. Cl. ................................ 33/125 R; 33/125 A; 33/125 C; 356/374
[58] Field of Search ............. 33/125 R, 125 C, 125 A, 33/125 T, 1 AA; 356/374, 373, 375; 250/237 G

[56] References Cited

U.S. PATENT DOCUMENTS

| | | | |
|---|---|---|---|
| 3,555,254 | 4/1967 | Gerber | 235/151 |
| 4,143,267 | 3/1979 | Johnson et al. | 33/125 A |
| 4,170,828 | 10/1979 | Ernst | 33/125 R |
| 4,225,931 | 6/1978 | Schwefel | 364/577 |
| 4,262,423 | 5/1979 | Affa | 33/125 A |
| 4,363,964 | 12/1982 | Schmitt | 250/237 G |
| 4,385,836 | 5/1983 | Schmitt | 356/374 |
| 4,400,890 | 8/1983 | Ohkubo et al. | 33/125 C |
| 4,403,859 | 9/1983 | Ernst | 33/125 C |

FOREIGN PATENT DOCUMENTS

| | | | |
|---|---|---|---|
| 2724858 | 6/1977 | Fed. Rep. of Germany | 33/125 R |
| 2729697 | 7/1977 | Fed. Rep. of Germany | 33/125 R |
| 2820753 | 5/1978 | Fed. Rep. of Germany | 33/125 R |
| 612500 | 7/1979 | Switzerland | 33/125 C |
| 2022843 | 12/1979 | United Kingdom | 33/125 C |

*Primary Examiner*—Willis Little
*Attorney, Agent, or Firm*—Willian, Brinks, Olds, Hofer, Gilson & Lione, Ltd.

[57] ABSTRACT

An error correction system for correcting machine errors or division errors in a position measuring instrument for precision machines is disclosed. The system is usable, for example, in conjunction with instruments for measuring the relative position of two objects, wherein an incremental grid division formed on a measuring scale is scanned by a scanning unit to generate analog measurement signals. According to this invention, the scale defines additional correction tracks which extend along the scale, parallel to the division, and are scanned by additional scanning elements included in the scanning unit. These additional scanning elements operate to generate analog correction signals from the correction track. These analog correction signals are used to correct the analog measurement signals with respect to errors such as amplitude errors, phase angle errors, and zero crossing errors.

22 Claims, 11 Drawing Figures

FIG. 4

ERROR CORRECTION SYSTEM FOR POSITION MEASURING INSTRUMENTS

BACKGROUND OF THE INVENTION

The present invention relates to a system for error correction which is suitable for correcting either machine errors or division errors in precision measuring instruments of the type used to measure the relative position of first and second objects. In particular, this invention is suited for use in precision measuring instruments of the type comprising a measuring scale which defines a measuring division, a scanning unit adapted to scan the division and to generate at least one analog measurement signal in response thereto, means for coupling the scale to the first object, means for coupling the scanning unit to the second object, and an evaluating unit coupled to the scanning unit to evaluate the at least one analog measurement signal.

A variety of error correction systems are known to the art for use with position measuring instruments. In German Pat. No. 27 24 858 a correction system for a length measuring device is disclosed which includes a link chain, the position of which is sensed by means of a transfer element. The lengths of this link chain are adjustable transversely to the measurement direction according to the magnitude of the error to be corrected. The accuracy and adjustability of this error correction system depends on the number of links used per unit of length in the measuring direction.

German Pat. No. 28 20 753 discloses an error correction system for position measuring instruments in which an error correction profile is formed as an integral component of a housing for a scale. This error correction profile as sensed by means of a transfer element which brings about a correcting relative movement between the scanning unit of the measuring system and the scale.

German DE-OS No. 27 29 697 discloses a process for interpolating periodic analog signals of a digital electric position measuring instrument. In the disclosed process, the analog signals are first digitized and the digital values are applied as inputs to a computer which generates the interpolation values. Particularly in applications in which a high subdivision factor is used in interpolation, corrections are made to the digital value stored in the computer prior to interpolation, which corrections compensate for faulty signal parameters of the analog signals. Previously determined correction values are stored in computer memory for later use.

In the correction systems described in the two patents identified above, additional mechanical elements are required to carry out the correction, and these additional mechanical elements can result in substantially increased external dimensions of the position measuring instrument. Such increases in external dimensions can be a severe drawback, and can make the measuring system unsuitable for certain applications. The position measuring system described in DE-OS No. 27 29 697 requires complicated electronic components to carry out the corrections.

SUMMARY OF THE INVENTION

The present invention is directed to an error correction system for position measuring instruments which can readily and directly be integrated into standard commercially utilized position measuring instruments, without substantial constructional modifications of the instruments. This invention is further directed to such error correction systems which require a minimum of mechanical and electrical components.

According to this invention, an error correction system for a precision measuring instrument of the type described above is provided, which system includes at least one correction track, defined by the scale, which encodes correction information. Means are provided in the scanning unit for scanning the at least one correction track and generating at least one analog correction signal in response thereto. In addition, means are provided for correcting the at least one analog measurement signal in response to the amplitude of the at least one correction signal.

This invention provides the particular advantage that no elaborate mechanical or electronic elements are required to effect the desired error correction. The present invention provides a simple and economical system which can readily be adapted for use with a wide variety of position measuring instruments. The preferred embodiments of this invention require little space to implement and entirely lack any parts which are subject to wear. For this reason, the preferred embodiments of this invention can be employed in a wide variety of measuring instruments and are extremely reliable in use. The preferred embodiments of this invention permit the correction of linear as well as nonlinear errors of the scale division or of the machine guiding system, regardless of the measuring length. This invention makes possible a subsequent error-free interpolation, even with a high degree of subdivision. Further advantageous features of this invention are set forth in the depending claims attached hereto.

The invention itself, together with further objects and attendant advantages, will best be understood by reference of the following detailed description taken in conjunction with the accompanying drawings.

BRIEF DESCRIPTION OF THE DRAWINGS

FIG. 1b is a longitudinal sectional view taken along line 1b—1b of FIG. 1a.

FIG. 2a is a partial edge view of the scale and a portion of the scanning unit of the measuring instrument of FIG. 1a.

FIG. 2b is a sectional view taken along line 2b—2b of FIG. 2a.

FIG. 2c is a sectional view taken along line 2c—2c of FIG. 2a.

DETAILED DESCRIPTION OF THE PRESENTLY PREFERRED EMBODIMENTS

Figure 1A:
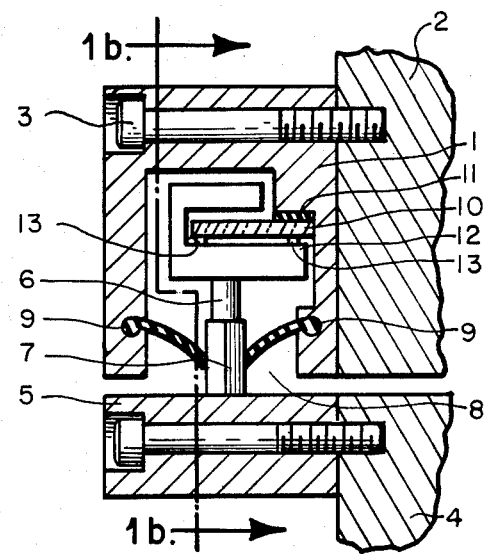
FIG. 1a is a cross-section of a length measuring instrument which incorporates a first preferred embodiment of this invention.
Figure 1B:
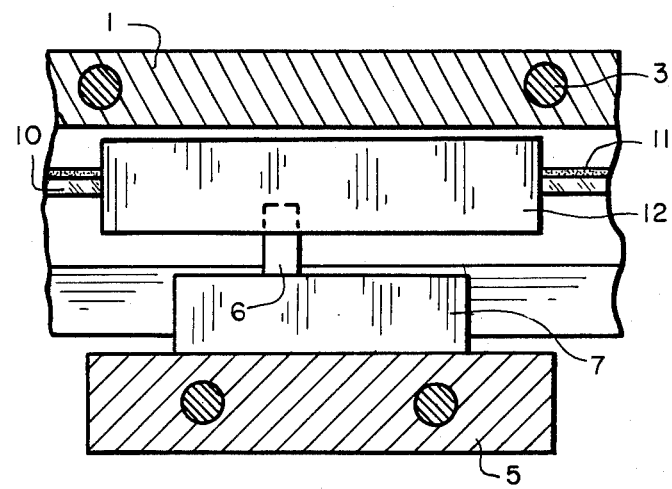

Turning now to the drawings, FIGS. 1a and 1b show a length measuring system having a housing 1 which is formed as a hollow profile and is fastened to a bed 2 of a processing machine (not shown) by means of a threaded fastener 3. The processing machine includes a slide piece 4 to which is fastened in any suitable manner a mounting foot 5. This mounting foot 5 includes a coupling member 6, a portion 7 of which is sword-shaped in order to pass through a slit 8 into the otherwise completely enclosed housing 1. Elastomeric sealing lips 9 are mounted to the housing 1 to close the slit 8 around the sword-shaped portion 7 of the coupling member 6 in order to exclude contaminants from the interior of the housing 1. The housing 1 defines an interior surface which serves as a mounting surface for a measuring scale 10. The measuring scale 10 is mounted to the housing 1 by means of an elastomeric adhesive layer 11. The scale 10 serves to guide and support a scanning unit 12 by means of rollers 13. The scanning unit 12 includes conventional means (not shown) which include an illuminating system and a plurality of photosensors for scanning an incremental division 14 included on the scale 10. The scanning unit 12 serves to generate periodic analog measurement signals in response to the division 14, which analog signals are applied to an evaluation/display unit which acts to display in digital form the relative position of the slide piece 4 with respect to the bed 2. Relative movement between the slide piece 4 and the bed 2 is transferred by the coupling member 6 to the scanning unit 12.

Figure 2A:
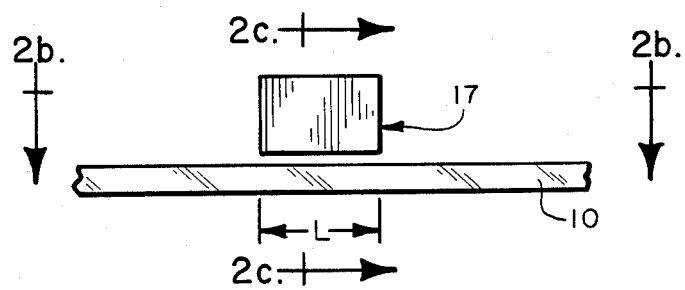
Figure 2B:
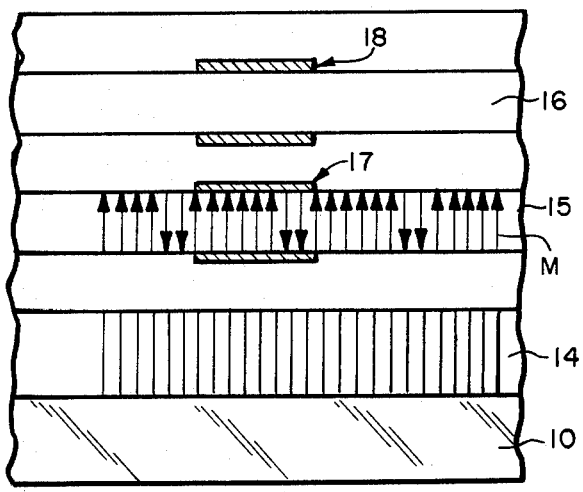
Figure 2C:
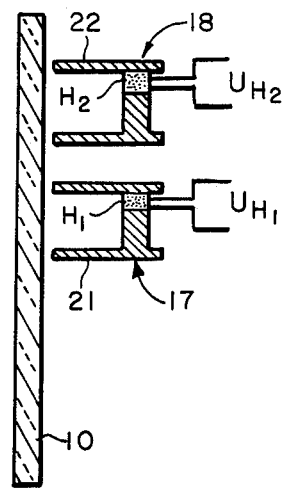
Figure 3:
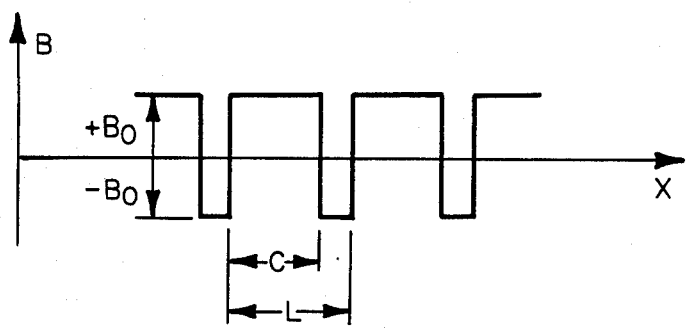
FIG. 3 is a diagram of magnetic field strength as a function of position along the measuring direction for the correction track 15 of FIG. 2b.

FIGS. 2a, 2b and 2c show detailed views of the scale 10 and portions of the scanning unit 12. As shown in these figures, two correction tracks 15, 16 are formed on the scale 10. As explained below, these correction tracks 15, 16 are used for the correction of division errors and/or machine guidance errors, and are formed on the transparent scale 10 parallel to the division 14. In the embodiment of FIGS. 2a, 2b and 2c, the correction tracks 15, 16 are formed by magnetizable tracks such that the correction information can be magnetically recorded on the correction tracks 15, 16. This correction information varies as a function of the error to be corrected. Each of the correction tracks 15, 16 is scanned by a respective Hall element 17, 18 in the scanning unit 12. These Hall elements 17, 18 include Hall effect sensors proper $H_1$, $H_2$ as well as respective iron armatures 21, 22 for the iron short circuit. In this embodiment, the correction tracks 15, 16 each include a respective magnetizable foil which is applied to the scale 10 to extend alongside of and parallel to the division 14. These magnetic foils are magnetized once positively up to saturation and once negatively up to saturation in patterns having a characteristic periodic pattern with a period length L. In FIG. 2b, the arrows shown on the correction track 15 schematically represent the magnetization vectors M. These magnetization vectors M are not represented in correction track 16 for simplicity. FIG. 3 shows a schematic representation of the magnetic induction generated by the magnetization vectors M of the correction track 15 as a function of position x along the measuring path.

As shown in FIG. 2a, each Hall element 17 is provided with a length L corresponding to the period length L of the magnetization pattern on the correction tracks 15, 16. As used in this application, the term length is used to refer to length in the direction of the measurement path, along the length of the measuring scale 10. Because of the correspondence between the length of the Hall element 17 and the characteristic period of the magnetic pattern on the correction track 15, the output of the Hall effect sensor $H_1$ is the Hall voltage $U_{H1}$ which equals $B_0 C - B_0 (L-C)$, or $B_0(2C-L)$. In effect, the Hall element 17 generates a Hall voltage $U_{H1}$ which is proportional to the mean value of the two magnetic inductions $+B_0$, $-B_0$ within a period. Because the length L of the Hall element 17 corresponds to the periodicity L of the magnetization vectors M, the Hall voltage $U_{H1}$ generated by the Hall element 17 does not change when the Hall element 17 is moved and the pulse width repetition ratio C/L is constant. A change in the pulse width repetition ratio C/L within the period L brings about a change of the Hall voltage $U_{H1}$.

For purposes of explanation, it can be assumed that the scanning unit 12 of the length measuring instrument photoelectrically scans a division 14 of the scale 10 and generates therefrom two precisely sinusoidal analog measurement signals (which can be either voltages or currents) in the following form:

$$U_1 = a \sin x \text{ and}$$
$$U_2 = a \cos x \quad \text{(Eq. 1)}$$

These two equations show that the maximum amplitude of the two analog signals is a. These two signals are characterized by a phase shift of 90° which is used for direction discrimination of the measuring direction. If the division 14 is affected by errors, then the two analog signals $U_1$, $U_2$ must be corrected with respect to their phase angles. Let the corrected signals be denoted as follows:

$$U_1' = a \sin(x+\phi) = a \sin x \cos \phi + a \cos x \sin \phi$$
$$U_2' = a \cos(x+\phi) = a \cos x \cos \phi - a \sin x \sin \phi \quad \text{(Eq. 2)}$$

If equation 1 is substituted in equation 2, the following result is obtained:

$$U_1' = U_1 \cos \phi + U_2 \sin \phi$$
$$U_2' = U_2 \cos \phi - U_1 \sin \phi \quad \text{(Eq. 3)}$$

Figure 4:
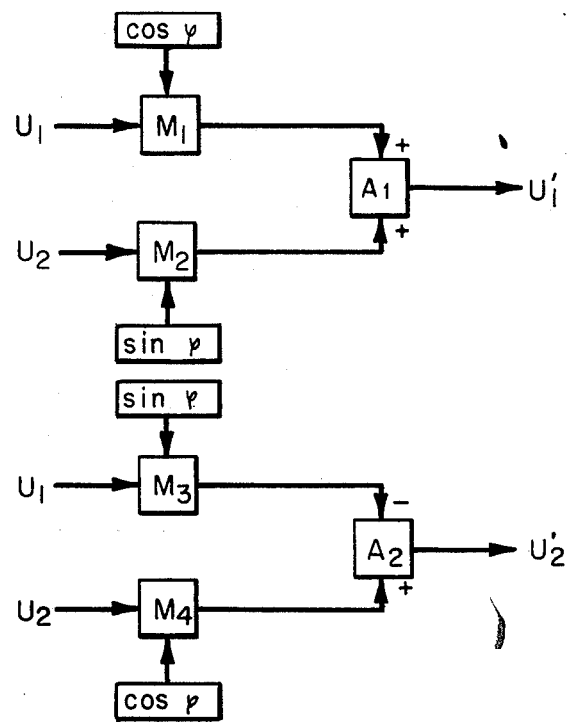
FIG. 4 is a block circuit diagram of a portion of the first presently preferred embodiment of this invention.

FIG. 4 shows the manner in which these two corrected analog signals $U_1'$, $U_2'$ can be obtained. As shown in FIG. 4, the periodic analog signals $U_1$, $U_2$ generated by the scanning unit 12 are, in accordance with Eq. 3, to be multiplied in each case by $\sin \phi$, $\cos \phi$ in multipliers $M_1$, $M_2$, $M_3$, $M_4$, and are thereupon to be added together in adders $A_1$, $A_2$. The angle $\phi$ is the amount by which the analog signals $U_1$, $U_2$ are to be corrected for phase angle.

For a scale with the grid constant g the following relations obtain:

$$x = 2\pi s/g$$
$$\phi = 2\pi f/g, \quad \text{(Eq. 3a)}$$

in which s signifies the displacement of the scanning unit 12 with respect to the scale 10 and f the phase angle correction $\phi$.

Figure 5:
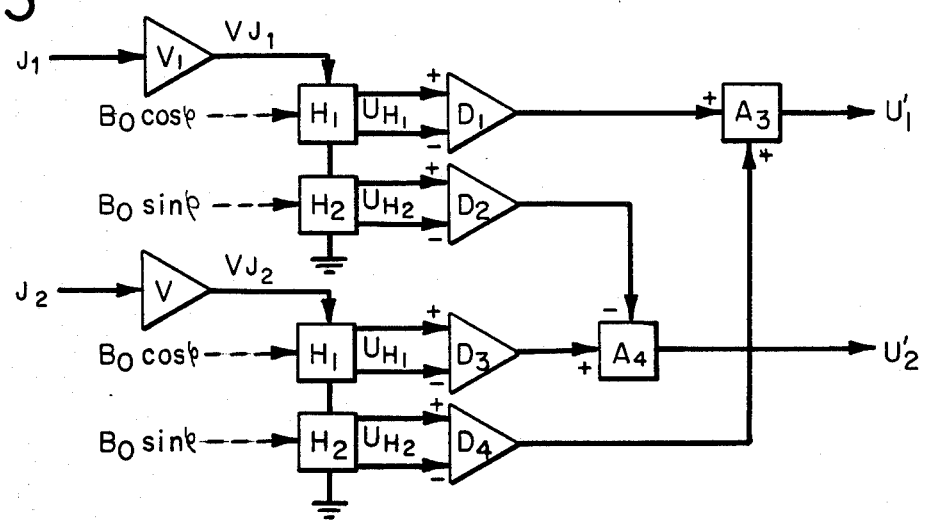
FIG. 5 is a block circuit diagram showing the manner in which the circuit of FIG. 4 can be implemented with Hall effect sensors.

According to this invention, the two factors $\sin \phi$, $\cos \phi$ needed for the error correction described above can be obtained as a function of the measuring path x directly from the two correction tracks 15, 16 positioned parallel to the division 14 on the scale 10 as shown in FIG. 2b. When the correction tracks 15, 16 are used to encode this information, the scanning of the correction tracks 15, 16 by the Hall elements 17, 18 to obtain the correction signals sin $\phi$, cos $\phi$ offers the advantage of a particularly simple system for performing the required multiplications. As shown in FIG. 5, the photo-sensors (not shown) of the scanning unit 12 scan the division 14 of the scale 10 and generate in a manner analogous to Eq. 1 above erroneous photofluxes which can be analyzed in the following terms:

$$J_1 = a \sin x$$

$$J_2 = a \cos x \qquad \text{(Eq. 3b)}$$

These currents $J_1$, $J_2$, are amplified in amplifiers $V_1$, $V_2$. The output signals from these amplifiers $V_1$, $V_2$ are applied as signals $VJ_1$, $VJ_2$ to the Hall generators $H_1$, $H_2$. In this notation, V signifies the amplification factor of the amplifiers $V_1$, $V_2$.

The Hall voltages $U_{H1}$, $U_{H2}$ generated by the Hall generators $H_1$, $H_2$ are generated as products of the currents $J_1$, $J_2$ and the magnetic inductions $B_1(x)$, $B_2(x)$ which are generated by the magnetized correction tracks 15, 16 and are a function of the error to be corrected. The following relations therefore obtain ($K_H$ = Hall constant):

$$U_{H1} = VJ_1 B_1(x) K_H$$

$$U_{H2} = VJ_2 B_2(x) K_H \qquad \text{(Eq. 3c)}$$

In order to correct errors of the type described above, the correction signals corresponding to Eq. 3 must take the following form:

$$B_1(x) = B_0 \sin \phi(x)$$

$$B_2(x) = B_0 \cos \phi(x) \qquad \text{(Eq. 3d)}$$

In accordance with Eq. 3, the Hall voltages $U_{H1}$, $U_{H2}$ are applied via differential amplifiers $D_1$, $D_2$, $D_3$, $D_4$ to adders $A_3$, $A_4$ in order to obtain the corrected analog signals $U_1'$, $U_2'$.

The magnetized correction tracks 15, 16 can also be scanned (in a manner not shown) by field plates. A particularly advantageous embodiment of this invention utilizes photoelectric scanning of the division of the scale and employs a scale formed of a magnetizable material, such as steel for example. Such a scale of course can be optically scanned only in direct illumination systems. However, such scales are well suited for simultaneously carrying optical information in the incremental division as well as magnetic correction information in the correction tracks. Other embodiments of this invention utilize a layer of a magnetizable material applied to a scale formed of a non-ferromagnetic material (such as steel having a low permeability and a low coercitive field strength).

Figure 6:
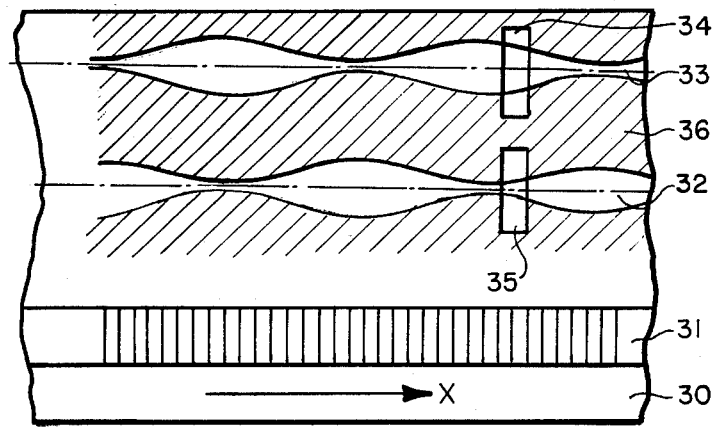
FIG. 6 shows a measuring scale including two correction tracks from a second preferred embodiment of this invention.

FIG. 6 shows another preferred embodiment of this invention which includes a transparent scale 30. This transparent scale 30 defines a measurement division 31 as well as two correction tracks 32, 33 which extend parallel to the division 31. The correction tracks 32, 33 are scanned by means of transmitted light by photo-sensors 34, 35, respectively. The division 31 may also be scanned photoelectrically. These correction tracks 32, 33 serve to record correction information optically, which information is a function of the desired error correction to be made. Each of the tracks 32, 33 is made up of photo-permeable or photo-impermeable layers on the scale 30, which are modulated in width so as to encode the desired correction information. Transparent correction tracks 32, 33 in a photo-impermeable layer 36 can be generated by means of laser irradiation or spark erosion. Since the correction signals can take on negative as well as positive amplitudes, the correction information is stored in a push-pull (Gegentakt) format. In this way, the correction tracks 32, 33 serve to record the desired correction information.

Of course, it should be understood that the correction tracks 32, 33 can also be adapted to be scanned photo-electrically in the direct illumination mode.

Figure 7:
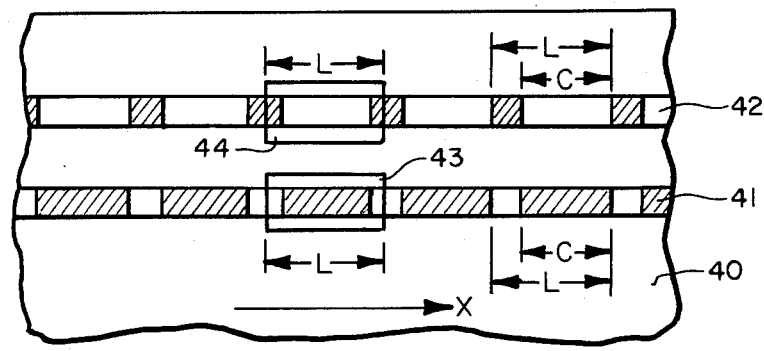
FIG. 7 shows a portion of the measuring scale of a third preferred embodiment of this invention.

Furthermore, optical correction tracks can be pulse-width modulated, as described above in conjunction with magnetic correction tracks. FIG. 7 depicts a transparent scale 40 which defines two correction tracks 41, 42 arranged alongside of a division (not shown). These two correction tracks 41, 42 optically encode desired correction information, and are scanned by two photo-sensors 43, 44 in the scanning unit 12 which are connected in push-pull. Preferably, the scanning fields of the photo-sensors 43, 44 are characterized by a length L. The correction tracks 41, 42 likewise are characterized by a characteristic period length L, wherein each period is made up of a transparent and opaque field. In the correction track 41 the opaque (cross-hatched) field has the length C and the transparent field has the length (L−C). Conversely, in the correction track 42, the transparent field has the length C and the opaque (cross-hatched) field has the length (L−C). The photo-sensors 43, 44, when circuited in difference, deliver a voltage U=U$_0$ (2C−L) when the correction tracks 41, 42 are scanned. This voltage U depends on the scanning ratio C/L, and in the case of a constant scanning ratio, C/L is independent of the movement of the photo-elements 43, 44 along the respective correction tracks 41, 42.

Figure 8:
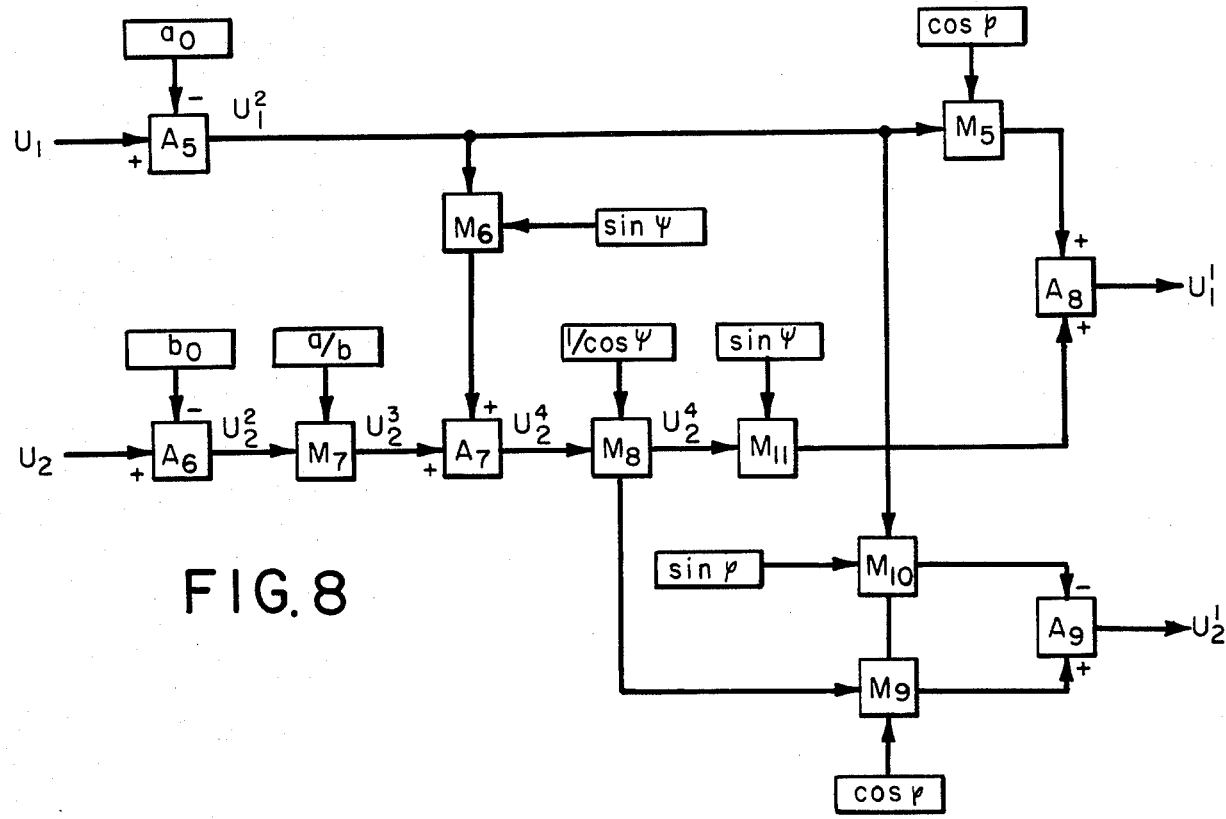
FIG. 8 shows a block circuit diagram for a fourth preferred embodiment of the error correction system of this invention.

FIG. 8 provides a circuit block diagram of a further preferred embodiment for correcting machine guidance errors and division errors. In the following discussion it will be assumed that the scanning unit 12 of the length measuring instrument delivers the following erroneous analog signals:

$$U_1 = a \sin x + a_0$$

$$U_2 = b \cos (x + \psi) + b_0 \qquad \text{(Eq. 4)}$$

Here, $a_0$ and $b_0$ signify the zero point errors of the analog signals $U_1$, $U_2$, and $\psi$ signifies the error of the phase angle between the two analog signals $U_1$, $U_2$ (which should be separated by a phase angle of exactly 90°). Furthermore, in Eq. 4 the analog signals $U_1$, $U_2$ have different amplitudes a, b and the division is characterized by phase error corresponding to the phase angle $\phi$. As before, the corrected, error-free analog signals should read as follows:

$$U_1^1 = a \sin (x + \phi)$$

$$U_2^1 = a \cos (x + \phi) \qquad \text{(Eq. 5)}$$

In order to achieve the desired correction the two analog signals $U_1$, $U_2$ in accordance with Eq. 4 are first corrected with respect to the zero point. This is accomplished by subtracting the constants $a_0$, $b_0$ from the analog signals $U_1$, $U_2$ respectively. The constants $a_0$, $b_0$ are in turn functions of the measurement path x and are obtained from two additional correction tracks on the scale. These correction tracks may take the form of any of the embodiments described above. Following this correction, the analog signals take the following form:

$$U_1{}^2 = a \sin x$$
$$U_2{}^2 = b \cos (x+\phi) \qquad \text{(Eq. 6)}$$

At this point an amplitude correction is performed on the analog signal $U_2{}^2$. The following relation obtains:

$$(a/b)U_2{}^2 = (a/b)(b \cos (x+\phi)) = a \cos (x+\phi) = U_2{}^3 \qquad \text{(Eq. 7)}$$

Therefore, $U_2{}^2$ from equation 6 is multiplied with the factor a/b.

The amplitude-corrected analog signal $U_2{}^3$ is now additionally corrected with respect to the phase angle $\psi$. The following relation holds:

$$U_2{}^3 = a \cos (x+\phi) = a \cos x \cos \phi - a \sin x \sin \phi \qquad \text{(Eq. 8)}$$

From this relation there is obtained:

$$a \cos x = (U_2{}^3 + a \sin x \sin \phi)/\cos \phi \qquad \text{(Eq. 9)}$$

For small values of $\psi$, $\cos \psi$ is approximately equal to 1 and equation 9 can therefore be simplified as follows:

$$U_2{}^4 = a \cos x = U_2{}^3 + a \sin x \sin \psi \qquad \text{(Eq. 10)}$$
$$= \frac{a}{b} U_2{}^2 + U_1{}^2 \sin \psi$$

At this point, the signals $U_1{}^2$ and $U_2{}^4$ are used for a correction with respect to the phase angle $\psi$. From Eq. 5 the following relations are obtained:

$$U_1{}^1 = a \sin x \cos \psi + a \cos x \sin \psi \qquad \text{(Eq. 11)}$$
$$= U_1{}^2 \cos \psi + U_2{}^4 \sin \psi$$
$$U_2{}^1 = a \cos x \cos \psi - a \sin x \sin \psi$$
$$= U_2{}^4 \cos \psi - U_1{}^2 \sin \psi$$

For the entire correction therefore there are required the following correction signals: $a_0$, $b_0$, a/b, $\sin \psi$, $\sin \phi$, $\cos \phi$. Each of these correction signals can be encoded on a respective correction track on the scale as described above and can be read by the scanning unit from the correction track.

In summary, the following operations are required:

| | |
|---|---|
| $U_1{}^2 = U_1 - a_o$ <br> $U_2{}^2 = U_2 - b_o$ | (zero point correction) |
| $U_2{}^3 = \frac{a}{b} U_2{}^2$ | (amplitude correction) |
| $U_2{}^4 = U_2{}^3 + U_1{}^2 \sin \psi$ | (phase angle correction) |
| $U_2{}^4 = (U_2{}^3 + U_1{}^2 \sin \psi)/\cos\psi$ | (phase angle correction in the event of large correction angles) |
| $U_1{}^1 = U_1{}^2 \cos \psi + U_2{}^4 \sin \psi$ <br> $U_2{}^1 = U_2{}^4 \cos \psi - U_1{}^2 \psi$ | (machine correction and division correction) |

In the event that the phase angle correction $\psi$ between the two analog signals $U_1$, $U_2$ is large and for this reason $\cos \psi$ is no longer approximately equal to 1, then the following relation can be substituted for Eq. 10 above:

$$U_2{}^4 = \frac{1}{\cos\psi} (U_2{}^3 + a \sin x \sin \psi) \qquad \text{(Eq. 12)}$$
$$= \frac{a}{b \cos\psi} U_2{}^2 + U_1{}^2 \tan\psi$$

In this event, an additional correction signal $1/\cos \psi$ is required which can be obtained from a further correction track on the scale. Of course, the subdivision of the corrections into the correction signals $\sin \psi$ and $1/\cos \psi$, or $\tan \psi$ and $1/\cos \psi$, or even a/b $\cos \psi$ and $\tan \psi$ is possible as well.

FIG. 8 clearly discloses the structure which can be used to obtain the corrected analog signals $U_1{}^1$, $U_2{}^1$ from the faulty analog signals $U_1$, $U_2$ by means of multipliers $M_5$–$M_{11}$ and adders $A_5$–$A_9$. These mathematical operations can be carried out with commercially available components which can for example be included in the evaluating unit.

Of course, it should be understood that a wide range of modifications and changes to the preferred embodiments described above will be apparent to those skilled in the art. For example, the correction tracks, described above, can also be recorded inductively or capacitively on the scale 10. Furthermore, the correction system of this invention can readily be adapted for use in magnetic, inductive, and capacitive position measuring instruments. It is therefore intended that the foregoing detailed description be regarded as illustrative rather than limiting, and that it be understood that it is the following claims, including all equivalents, which are intended to define the scope of this invention.

I claim:

1. In a precision measuring instrument for measuring the relative position of first and second objects, of the type comprising a measuring scale which defines a measuring division, a scanning unit adapted to scan the division and to generate at least one analog signal in response thereto, means for coupling the scale to the first object, means for coupling the scanning unit to the second object, and an evaluating unit coupled to the scanning unit to evaluate the at least one analog signal, the improvement comprising:

at least one correction track, defined by the scale, which encodes correction information, said correction track associated with the measuring division and encoding correction information indicative of the magnitude of an error in the at least one analog signal, said error comprising at least one of measuring division errors and guidance errors;

means, included in the scanning unit, for scanning the at least one correction track and generating at least one analog correction signal in response thereto, a selected parameter of said analog correction signal indicative of the magnitude of said error in the at least one analog signal; and means for correcting the at least one analog signal in response to the selected parameter of the at least one correction signal.

2. The invention of claim 1 wherein the at least one correction track comprises a magnetic recording medium which records the correction information.

3. The invention of claim 1 wherein the at least one correction track comprises an optical recording medium which records the correction information.

4. The invention of claim 2 wherein the magnetic recording medium comprises a magnetizable foil.

5. The invention of claim 2 wherein the magnetic recording medium comprises a magnetizable layer.

6. The invention of claim 2 wherein the at least one correction track encodes correction information by pulse width modulation.

7. The invention of claim 2 wherein the means for scanning the at least one correction track comprises at least one Hall effect sensor.

8. The invention of claim 2 wherein the means for scanning the at least one correction track comprises at least one field plate positioned to scan the at least one correction track.

9. The invention of claim 8 wherein the means for scanning the at least one correction track further comprises at least one Hall effect sensor coupled to the at least one field plate, wherein the correction information is encoded on the at least one correction track with a characteristic period length, and wherein the length of both the at least one field plate and the at least one Hall effect sensor corresponds to the period length.

10. The invention of claim 1 wherein the scale comprises a magnetizable material.

11. The invention of claim 3 wherein the means for scanning the at least one correction track comprises at least one photo-sensor.

12. The invention of claim 3 wherein the at least one correction track comprises a photo-impermeable layer which defines at least one photo-permeable region therein.

13. The invention of claim 3 wherein the at least one correction track encodes the correction information by amplitude modulation.

14. The invention of claim 12 wherein the at least one photo-permeable region is formed by means of laser irradiation.

15. The invention of claim 12 wherein the at least one photo-permeable region is formed by means of spark erosion.

16. The invention of claim 3 wherein the at least one correction track encodes the correction information by pulse width modulation.

17. The invention of claim 16 wherein the at least one correction track comprises a sequence of photo-impermeable and photo-permeable regions arranged within a characteristic period length.

18. The invention of claim 17 wherein the means for scanning the at least one correction track comprises at least one photo-sensor, and wherein the length of the scanning field of the at least one photo-sensor corresponds to the period length of the at least one correction track.

19. The invention of claim 3 wherein the at least one correction track encodes the correction information in push-pull format.

20. The invention of claim 1 wherein the at least one correction track comprises means for inductively recording the correction information.

21. The invention of claim 1 wherein the at least one correction track comprises means for capacitively recording the correction information.

22. The invention of claim 1 wherein said error in the at least one analog signal results at least in part from positional errors of the measuring division with respect to a predetermined external frame of reference.

* * * * *

UNITED STATES PATENT AND TRADEMARK OFFICE
CERTIFICATE OF CORRECTION

PATENT NO. : 4,490,914
DATED : Jan. 1, 1985
INVENTOR(S) : Alfons Spies

Page 1 of 2

It is certified that error appears in the above-identified patent and that said Letters Patent is hereby corrected as shown below:

IN THE DETAILED DESCRIPTION OF THE
PRESENTLY PREFERRED EMBODIMENT

In column 6, line 50, please delete the symbol "$\phi$" and substitute therefor --$\psi$--;

In column 7, line 11, please delete the symbol "$\phi$" and substitute therefor --$\psi$--;

In column 7, line 16, please delete the symbol "$\phi$" (two occurrences) and substitute therefor (in each occurrence) --$\psi$--;

In column 7, line 23, please delete the symbol "$\phi$" (three occurrences) and substitute therefor (in each occurrence) --$\psi$--;

In column 7, line 27, please delete the symbol "$\phi$" (two occurrences) and substitute therefor (in each occurrence) --$\psi$--;

In column 7, line 40, please delete the symbol "$\psi$" (two occurrences) and substitute therefor (in each occurrence) --$\phi$--;

In column 7, line 42, please delete the symbol "$\psi$" (two occurrences) and substitute therefor (in each occurrence) --$\phi$--;

UNITED STATES PATENT AND TRADEMARK OFFICE
CERTIFICATE OF CORRECTION

PATENT NO. : 4,490,914
DATED : Jan. 1, 1985
INVENTOR(S) : Alfons Spies

Page 2 of 2

It is certified that error appears in the above-identified patent and that said Letters Patent is hereby corrected as shown below:

In column 7, line 44, please delete the symbol "$\psi$" (two occurrences) and substitute therefor (in each occurrence) --$\phi$--;

In column 7, line 46, please delete the symbol "$\psi$" (two occurrences) and substitute therefor (in each occurrence) --$\phi$--;

In column 7, line 65, please delete the symbol "$\psi$" (two occurrences) and substitute therefor (in each occurrence) --$\phi$--;

In column 7, line 66, please delete the symbol "$\psi$" (first occurrence) and substitute therefor --$\phi$--;

In column 7, line 66, please delete "$U_1^2 \psi$" and substitute therefor --$U_1^2 \sin\phi$--.

Signed and Sealed this

Tenth Day of May, 1988

Attest:

DONALD J. QUIGG

Attesting Officer

Commissioner of Patents and Trademarks